United States Patent [19]

Kawamura

[11] Patent Number: 5,684,110
[45] Date of Patent: Nov. 4, 1997

[54] SILICONE RUBBER COMPOSITION FOR FORMED-IN-PLACE GASKETS

[75] Inventor: Naoji Kawamura, Chiba Prefecture, Japan

[73] Assignee: Dow Corning Toray Silicone Co., Ltd., Tokyo, Japan

[21] Appl. No.: 673,902

[22] Filed: Jul. 1, 1996

[30] Foreign Application Priority Data

Jul. 4, 1995 [JP] Japan .................................. 7-191107

[51] Int. Cl.$^6$ .................................................. C08G 77/06
[52] U.S. Cl. ........................... 528/15; 528/16; 528/17; 528/31; 528/32; 528/33
[58] Field of Search .......................... 528/15, 16, 17, 528/31, 32, 33

[56] References Cited

U.S. PATENT DOCUMENTS

| | | | |
|---|---|---|---|
| 4,230,498 | 10/1980 | Rueckl | 106/58 |
| 4,689,363 | 8/1987 | Inoue et al. | 524/394 |
| 4,754,013 | 6/1988 | Antonen | 528/15 |
| 5,486,258 | 1/1996 | Onishi | 156/307.5 |
| 5,504,174 | 4/1996 | Onishi | 528/15 |

FOREIGN PATENT DOCUMENTS

| | | | |
|---|---|---|---|
| 0595740 | 5/1994 | European Pat. Off. | C09K 3/10 |
| 0604997 | 7/1994 | European Pat. Off. | C08L 83/04 |
| 03017157 | 1/1991 | Japan . | |
| 07003164 | 1/1995 | Japan . | |

OTHER PUBLICATIONS

03017157 Japanese Abstract Jan. 1991.

58007451 Japanese Abstract Jan. 1983.

07003164 Japanese Abstract Jan. 1995.

*Primary Examiner*—Karen A. Dean
*Attorney, Agent, or Firm*—Paula J. Lagattuta

[57] ABSTRACT

A silicone rubber composition which can be used to provide a formed-in-place gasket which exhibits excellent pressure resistance immediately after its site application and cures into a highly pressure-resistant and strongly adherent silicone rubber gasket comprising (A) 100 weight parts of a mixture of comprising an alkoxy-substituted polyorganosiloxane and an alkenyl-substituted polyorganosiloxane; (B) a hydrogen-containing polyorganosiloxane an alkoxysilane; a condensation reaction catalyst; and platinum catalyst.

12 Claims, No Drawings

SILICONE RUBBER COMPOSITION FOR FORMED-IN-PLACE GASKETS

BACKGROUND OF THE INVENTION

1. Field of the Invention

This invention relates to silicone rubber compositions for service as formed-in-place gaskets (hereinafter "FIPG"). More particularly, this invention relates to a silicone rubber composition for FIPG service that exhibits an excellent pressure resistance immediately after its site application and that cures to yield a highly adherent and highly pressure-resistant silicone rubber gasket.

2. Description of the Related Art

One example of a method for preventing the leakage of gas or fluid across the joint surface between or among two or more detachable joining or connecting members consists of a forced fastening method in which a fixed-shape gasket is bolted down. However, so-called formed-in-place gasket technology has entered into use for such purposes as improving the pressure resistance of the joint surface and/or achieving a substantial process time reduction by eliminating the step in which the fixed-shape gasket is installed. In FIPG technology, a rubber gasket is formed in the joint surface through the application of a liquid rubber composition by a robot applicator to at least 1 of the joining surfaces of the joining members and thereafter fastening with bolts.

The silicone rubber compositions used in FIPG technology include condensation-reaction curing silicone rubber compositions and addition-reaction curing silicone rubber compositions. The condensation-reaction curing silicone rubber compositions are exemplified as follows:. the composition taught in Japanese Patent Application Laid Open (Kokai or Unexamined) Number Sho 62-11768 (11,768/1987) comprising hydroxyl-terminated polyorganosiloxane, organosilane or organosiloxane having at least 2 silicon-bonded hydrolyzable groups in each molecule, and a weakly acidic alkali metal salt whose acid dissociation constant $pK_a$ is from 2.0 to 12.0; the composition taught in Japanese Patent Application Laid Open (Kokai or Unexamined) Number Sho 64-14272 (14,272/1989) comprising hydroxyl-terminated polydiorganosiloxane, organosilane or siloxane having at least 2 silicon-bonded hydrolyzable groups in each molecule, and organosilane or siloxane having at least 1 silicon-bonded vinyl and at least 1 silicon-bonded hydroxyl in each molecule; and the composition taught in Japanese Patent Application Laid Open (Kokai or Unexamined) Number Hei 3-17157 (17,157/1991) comprising hydroxyl-terminated polyorganosiloxane, oximesilane or partial hydrolyzate thereof, condensation reaction catalyst. alkoxysilane or partial hydrolysis condensate thereof, and aluminum stearate. The addition-reaction curing silicone rubber compositions are exemplified by the following: the composition taught in Japanese Patent Application Laid Open (Kokai or Unexamined) Number Sho 58-7451 (7,451/1983) comprising polyorganosiloxane containing at least 2 silicon-bonded alkenyl groups in each molecule, polyorganohydrogensiloxane containing at least 3 silicon-bonded hydrogen atoms in each molecule, reinforcing silica filler, magnesium oxide, and a platinum catalyst; and the composition disclosed in Japanese Patent Application Laid Open (Kokai or Unexamined) Number Hei 7-3164 (3,164/1995) comprising polyorganosiloxane containing at least 2 silicon-bonded alkenyl groups in each molecule, polyorganohydrogensiloxane containing at least 3 silicon-bonded hydrogen in each molecule, platinum catalyst, silicon-functional isocyanurate, and organic solvent.

In some cases, the FIPG fabrication sequence consists of application of the silicone rubber composition to the joint surface by a robot applicator followed immediately by bolting down and then immediately thereafter by pressure-resistance testing. In this type of fabrication sequence condensation-reaction curing silicone rubber compositions suffer from the problem of a poor pressure resistance immediately after application. In contrast, addition-reaction curing silicone rubber compositions cure in a short period of time at room temperature and as a result exhibit good pressure resistance immediately after their application. However, the silicone rubber gaskets generated by the cure of addition-reaction curing silicone rubber compositions have poor adhesion to the joint surfaces. As a result of this poor adherence, the gasket will readily delaminate from the joint surfaces—thereby causing a substantial drop in pressure resistance—when subjected to repeated changes in the fastening pressure due pressure changes, temperature variations, thermal stress variations, vibration, and the like.

The inventor achieved the present invention as the result of extensive investigations directed to solving the problems described above.

In specific terms, the object of the present invention is to provide a silicone rubber composition for FIPG service that exhibits an excellent pressure resistance immediately after its site application and that cures into a highly pressure-resistant and strongly adherent silicone rubber gasket.

SUMMARY OF THE INVENTION

The present invention relates to a silicone rubber composition for application as a formed-in-place gasket (hereinafter abbreviated as FIPG silicone rubber composition), wherein said composition comprises:

(A) 100 parts by weight of a mixture comprising:
 (a) 5 to 95 weight % of an alkoxy-substituted polyorganosiloxane that has a viscosity at 25° C. of 20 to 1,000,000 centipoise and that contains an average of at least two silicon-bonded alkoxy groups per molecule; and
 (b) 95 to 5 weight % of a alkenyl-substituted polyorganosiloxane that has a viscosity at 25° C. of 20 to 1,000,000 centipoise and that contains an average of at least two silicon-bonded lower alkenyl groups per molecule; and (B) polyorganosiloxane that contains an average of at least two silicon-bonded hydrogen atoms per molecule, in a quantity that affords a value of 0.3 to 10 for the molar ratio of silicon-bonded hydrogen to silicon-bonded lower alkenyl in component (b);

(C) 0.01 to 20 weight parts alkoxysilane with the general formula

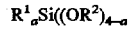

where each $R^1$ is individually selected from the group consisting of monovalent hydrocarbon groups, epoxy-functional organic groups, and acrylic-functional organic groups, $R^2$ is alkyl or alkoxyalkyl, and a is 0, 1, or 2; or partial hydrolysis condensate thereof;

(D) 0.01 to 20 weight parts condensation reaction catalyst; and (E) platinum catalyst in a catalytic quantity.

DETAILED DESCRIPTION OF THE INVENTION

The FIPG silicone rubber composition according to the present invention will be explained in greater detail in the following. Component (A), which is the base or main ingredient of the subject composition, consists of a mixture of (a) polyorganosiloxane that has a viscosity at 25° C. of 20 to 1,000,000 centipoise and that contains an average of at least two silicon-bonded alkoxy groups per molecule and (b) polyorganosiloxane that has a viscosity at 25° C. of 20 to 1,000,000 centipoise and that contains an average of at least two silicon-bonded lower alkenyl groups per molecule. Component (a) should contain an average of at least two silicon-bonded alkoxy groups per molecule. When component (a) contains an average of less than two silicon-bonded alkoxy groups per molecule, the resulting composition will not cure adequately and/or will be prone to suffer from curing inhibition and the obtained silicone rubber gasket will exhibit an inadequate pressure resistance and adherence. The molecular structure of component (a) is exemplified by straight chain, partially branched straight chain, and branched chain with straight chain being preferred.

The silicon-bonded alkoxy in component (a) is exemplified by methoxy, ethoxy, propoxy, and butoxy with methoxy being preferred. The alkoxy group may be bonded in terminal or nonterminal position on the molecular chain, but bonding at the molecular chain terminals is preferred because this yields good reactivity. The alkoxy group may be bonded to main-chain silicon or may be bonded to a silicon atom that in turn is bonded to a main-chain silicon atom across an alkylene group.

The non-alkoxy silicon-bonded groups in component (a) are exemplified by alkyl groups such as methyl, ethyl, propyl, butyl, pentyl, hexyl, heptyl, octyl, nonyl, decyl, octadecyl, etc.; cycloalkyl groups such as cyclopentyl, cyclohexyl, and so forth; aryl groups such as phenyl, tolyl, xylyl, naphthyl, and so forth; aralkyl groups such as benzyl, phenethyl, phenylpropyl, and so forth; and haloalkyl groups such as 3-chloropropyl, 3,3,3-trifluoropropyl, and so forth. Methyl and phenyl are preferred herein.

Component (a) should have a viscosity at 25° C. of 20 to 1,000,000 centipoise and preferably has a viscosity of 100 to 500,000 centipoise. The ultimately obtained silicone rubber gasket will have poor physical properties, i.e., flexibility, elongation, and so forth, when component (a) has a viscosity at 25° C. less than 20 centipoise. When, on the other hand, this viscosity exceeds 1,000,000 centipoise, the resulting composition cannot be applied by a robot applicator. Component (a) is exemplified by trimethoxysiloxy-endblocked polydimethylsiloxane, methyldimethoxysiloxy-endblocked polydimethylsiloxane, and trimethoxysilylethyldimethylsiloxy-endblocked polydimethylsiloxane.

Component (b) should contain an average of at least two silicon-bonded lower alkenyl groups per molecule. The resulting composition will not exhibit an acceptable pressure resistance immediately after its application when component (b) contains an average of less than 2 such alkenyl groups per molecule. The molecular structure of component (b) is exemplified by straight chain, partially branched straight chain, branched chain, cyclic, and resin structures. The silicon-bonded lower alkenyl in component (b) is exemplified by vinyl, allyl, butenyl, pentenyl, and hexenyl with vinyl being preferred. The alkenyl group may be bonded in terminal or nonterminal position on the molecular chain, but bonding at the molecular chain terminals is preferred because this yields good reactivity. The non-alkenyl silicon-bonded groups in component (b) are exemplified by alkyl groups such as methyl, ethyl, propyl, butyl, pentyl, hexyl, heptyl, octyl, nonyl, decyl, octadecyl, etc.; cycloalkyl groups such as cyclopentyl, cyclohexyl, and so forth; aryl groups such as phenyl, tolyl, xylyl, naphthyl, and so forth; aralkyl groups such as benzyl, phenethyl, phenylpropyl, and so forth; and haloalkyl groups such as 3-chloropropyl, 3,3,3-trifluoropropyl, and so forth. Methyl and phenyl are preferred here. Component (b) should have a viscosity at 25° C. of 20 to 1,000,000 centipoise and preferably has a viscosity of 100 to 500,000 centipoise. The ultimately obtained silicone rubber gasket will have poor physical properties, i.e., flexibility, elongation, and so forth, when component (b) has a viscosity at 25° C. less than 20 centipoise. When, on the other hand, this viscosity exceeds 1,000,000 centipoise, the resulting composition cannot be applied by a robot applicator. Component (b) is exemplified by dimethylvinylsiloxy-endblocked polydimethylsiloxane; dimethylvinylsiloxy-endblocked dimethylsiloxane-methylvinylsiloxane copolymer; trimethylsiloxy-endblocked polymethylvinylsiloxane; trimethylsiloxy-endblocked dimethylsiloxane-methylvinylsiloxane copolymer; polyorganosiloxane composed of fie $(CH_2=CH)(CH_3)_2SiO_{1/2}$ and $SiO_{4/2}$ units; polyorganosiloxane composed of the $(CH_3)_3SiO_{1/2}$, $(CH_2=CH)(CH_3)_2SiO_{1/2}$, and $SiO_{4/2}$ units; polyorganosiloxane composed of the $(CH_3)_3SiO_{1/2}$, $(CH_2=CH)(CH_3)_2SiO_{1/2}$, $(CH_3)_2SiO_{2/2}$, and $SiO_{4/2}$ units; and mixtures of the preceding polyorganosiloxanes.

Component (a) should account for 5 to 95 weight % of component (A) with component (b) constituting the remainder. When component (a) is less than 5 weight % of component (A), the resulting composition will not cure adequately and/or will be prone to suffer from curing inhibition and the obtained silicone rubber gasket will exhibit an inadequate pressure resistance and adherence. When component (a) exceeds 95 weight %, the resulting composition will not manifest an acceptable pressure resistance immediately after its application.

The polyorganosiloxane (B) undergoes an addition reaction with component (b) and thereby crosslinks component (b). Component (B) should contain an average of at least two silicon-bonded hydrogen atoms per molecule: the resulting composition will not exhibit an acceptable pressure resistance immediately after application when component (B) contains an average of less than two silicon-bonded hydrogen atoms per molecule. The molecular structure of component (B) is exemplified by straight chain, partially branched straight chain, cyclic, and resin structures. The silicon-bonded hydrogen may be bonded in terminal or nonterminal position on the molecular chain. The silicon-bonded groups in component (B) other than hydrogen are exemplified by alkyl groups such as methyl, ethyl, propyl, butyl, pentyl, hexyl, heptyl, octyl, nonyl, decyl, octadecyl, etc.; cycloalkyl groups such as cyclopentyl, cyclohexyl, and so forth; aryl groups such as phenyl, tolyl, xylyl, naphthyl, and so forth; aralkyl groups such as benzyl, phenethyl, phenylpropyl, and so forth; and haloalkyl groups such as 3-chloropropyl, 3,3,3-trifluoropropyl, and so forth. Methyl and phenyl am preferred here. Component (B) preferably has a viscosity at 25° C. of 1 to 10,000 centipoise. Component (B) is exemplified by trimethylsiloxy-endblocked polymethylhydrogensiloxane; trimethylsiloxy-endblocked dimethylsiloxane-methylhydrogensiloxane copolymer; dimethylhydrogensiloxy-endblocked polydimethylsiloxane; dimethylhydrogensiloxy-endblocked dimethylsiloxane-methylhydrogensiloxane copolymer; polyorganosiloxane composed of the $(CH_3)_2HSiO_{1/2}$ and $SiO_{4/2}$ units; polyorganosiloxane composed of the $(CH_3)_3SiO_{1/2}$, $(CH_3)_2HSiO_{1/2}$, and $SiO_{4/2}$ units; polyorganosiloxane composed of the $(CH_3)_3SiO_{1/2}$, $(CH_3)_2HSiO_{1/2}$, $(CH_3)_2SiO_{2/2}$, and $SiO_{4/2}$ units; and mixtures of the preceding polyorganosiloxanes.

Component (B) should be added in an amount that affords a value from 0.3 to 10 for the molar ratio of silicon-bonded hydrogen to silicon-bonded lower alkenyl in component (b). When this molar ratio falls below 0.3, the resulting composition will not manifest an acceptable pressure resistance immediately after its application. When this molar ratio exceeds 10, the ultimately obtained silicone rubber gasket will exhibit diminished physical properties.

Component (C), alkoxysilane or partial hydrolysis condensate thereof, undergoes a condensation reaction with component (a) and thereby crosslinks component (a). The alkoxysilane (C) is defined by the following general formula.

$$R^1{}_a Si(OR^2)_{4-a}$$

where each $R^1$ is individually selected from the group consisting of monovalent hydrocarbon groups, epoxy-functional organic groups, and acrylic-functional organic groups. The monovalent hydrocarbon groups are exemplified by alkyl groups such as methyl, ethyl, propyl, butyl, pentyl, hexyl, heptyl, octyl, nonyl, decyl, octadecyl, and so forth; cycloalkyl groups such as cyclopentyl, cyclohexyl, and so forth; alkenyl groups such as vinyl, allyl, and so forth; aryl groups such as phenyl, tolyl, xylyl, naphthyl, and so forth; aralkyl groups: such as benzyl, phenethyl, phenylpropyl, and so forth; and haloalkyl groups such as 3-chloropropyl, 3,3,3-trifluoropropyl, and so forth. The epoxy-functional organic groups are exemplified by oxiranyl groups such as 4-oxiranylbutyl, 8-oxiranyloctyl, and so forth; glycidoxyalkyl groups such as 3-glycidoxypropyl, 4-glycidoxybutyl, and so forth; and the 2-(3,4-epoxycyclohexyl)vinyl group. The acrylic-functional organic groups are exemplified by methacryloxypropyl and methacryloxybutyl. $R^2$ in the preceding formula represents alkyl and alkoxyalkyl, wherein the alkyl is exemplified by methyl, ethyl, propyl, butyl, pentyl, hexyl, heptyl, octyl, nonyl, decyl, octadecyl, and so forth, and the alkoxyalkyl is exemplified by methoxyethyl, ethoxyethyl, methoxypropyl, methoxybutyl, and so forth. The methoxy group is preferred. The subscript a in the formula is 0, 1, or 2 and is preferably 1.

Component (C) is exemplified by alkoxysilanes such as tetramethoxysilane, tetraethoxysilane, methyl Cellosolve orthosilicate, methyltrimethoxysilane, methyltriethoxysilane, ethyltrimethoxysilane, vinyltrimethoxysilane, phenyltrimethoxysilane, methyltrimethoxyethoxysilane, dimethyldimethoxysilane, diphenyldimethoxysilane, and so forth; by epoxy-functional alkoxysilanes such as 4-oxiranylbutyltrimethoxysilane, 8-oxiranyloctyltrimethoxysilane, 3-glycidoxypropyltrimethoxysilane, 2-(3,4-epoxycyclohexyl)ethyltrimethoxysilane, and so forth; by acrylic-functional alkoxysilanes such as 3-methacryloxypropyltrimethoxysilane, 4-methacryloxybutyltrimethoxysilane, and so forth; and by the partial hydrolysis condensates of these alkoxysilanes. Only a single alkoxysilane or partial hydrolysis condensate thereof may be used, or a mixture of two or more different alkoxysilanes or partial hydrolysis condensates thereof may be employed.

Component (C) is added at 0.01 to 20 weight parts and preferably at 0.1 to 10 weight parts, in each case per 100 weight parts component (A). The use of less than 0.01 weight part component (C) per 100 weight parts component (A) results in such problems for the resulting composition as a failure to undergo adequate cure, a pronounced tendency to suffer from cure inhibition, and/or a pronounced tendency to thicken or gel during storage. The use of more than 20 weight parts component (C) causes the resulting composition to undergo a very slow cure, with the result that the composition will exhibit an unacceptable pressure resistance immediately after its application.

The condensation reaction catalyst (D) is a catalyst that accelerates the condensation reaction between components (a) and (C). Component (D) is exemplified by organotitanium condensation reaction catalysts, organozirconium condensation reaction catalysts, and organoaluminum condensation reaction catalysts. The organotitanium condensation reaction catalysts are exemplified by organotitanate esters such as tetrabutyl titanate, tetraisopropyl titanate, and so forth, and by organotitanium chelate compounds such as diisopropoxybis(acetylacetate)titanium, diisopropoxybis (ethyl acetoacetate)titanium, and so forth. The organozirconium condensation reaction catalysts are exemplified by organozirconium esters such as zirconium tetrapropylate, zirconium tetrabutylate, and so forth, and by organozirconium chelate compounds such as zirconium diacetate, zirconium tetra(acetylacetonate), tributoxyzirconium acetylacetonate, dibutoxyzirconium bis(acetylacetonate), tributoxyzirconium acetoacetate, dibutoxyzirconium acetylacetonato(ethyl acetoacetate), and the like. The organoaluminum condensation reaction catalysts are exemplified by organoaluminum esters such as aluminum triethylate, aluminum triisopropylate, aluminum tri(sec-butylate), mono (sec-butoxy)aluminum diisopropylate, and so forth, and by organoaluminum chelate compounds such as diisopropoxyaluminum (ethyl acetoacetate), aluminum tale(ethyl acetoacetate), aluminum bis(ethyl acetoacetate) monoacetylacetonate, aluminum tris(acetylacetonate), and so forth.

Component (D) should be added at from 0.01 to 20 weight parts and preferably at from 0.1 to 5 weight parts, in each case per 100 weight parts component (A). The resulting composition will suffer from an extremely slow cure at a component (D) addition of less than 0.01 weight part per 100 weight parts component (A). When on the other hand the addition of component (D) exceeds 20 weight parts, the resulting composition will suffer from an unacceptable storage stability.

The platinum catalyst (E) is a catalyst that accelerates the addition reaction between components (b) and (B), and it is exemplified by platinum black, platinum-on-active carbon, platinum-on-silica micropowder, chloroplatinic acid, alcohol solutions of chloroplatinic acid, platinum-olefin complexes, platinum-vinylsiloxane complexes, and microparticulate catalysts comprising thermoplastic resin containing a platinum catalyst as listed above. This thermoplastic resin is exemplified by silicones, polycarbonate resins, acrylic resins, nylon resins, and polyester resins. Moreover, the thermoplastic resin preferably has a softening point from 5° C. to 200° C. and preferably has a particle size from 0.01 to 10 micrometers.

Component (E) is added in a catalytic amount. It is preferably added in an amount that provides from 0.01 to 1,000 weight-ppm and particularly preferably from 0.5 to 200 weight-ppm, in each case as platinum metal atoms in component (E) based on the present composition.

The composition according to the present invention is prepared by mixing the above-described components (A) to (E) to homogeneity. However, the composition according to the present invention may contain an addition-reaction inhibitor as an optional component in order to improve the composition's coatability. These addition-reaction inhibitors are exemplified by acetylenic compounds such as 3-methyl- 1-butyn-3-ol, 3,5-dimethyl-1-hexyn-3-ol, 3-phenyl-1-butyn-3-ol, and so forth; by ene-yne compounds such as 3-methyl-3-penten-1-yne, 3,5-dimethyl-3-hexen-1-yne, and so forth; by cycloalkenylsiloxanes such as 1,3,5,7-tetramethyl-1,3,5,7-tetravinylcyclotetrasiloxane, 1,3,5,7-tetramethyl-1,3,5,7-tetrahexenylcyclotetrasiloxane, and so forth; by triazole compounds such as benzotriazole and so forth; and otherwise by phosphines, mercaptans, and hydrazine compounds. The addition of the addition-reaction inhibitor will vary as a function of the coating conditions, but 0.001 to 5 weight parts per 100 weight parts component (A) is generally preferred.

The composition according to the present invention may also contain other components on an optional basis, for example, inorganic fillers such as the micropowders of dry-process silica, wet-process silica, quartz, calcium carbonate, titanium dioxide, diatomaceous earth, aluminum oxide, aluminum hydroxide, zinc oxide, zinc carbonate, and so forth, and also inorganic fillers comprising the preceding inorganic fillers whose Surface has been treated with an organoalkoxysilane such as methyltrimethoxysilane, an organohalosilane such as trimethylchlorosilane, an organosilazane such as hexamethyldisilazane, or a siloxane oligomer such as hydroxyl-endblocked dimethylsiloxane oligomer, hydroxyl-endblocked methylphenylsiloxane oligomer, or hydroxyl-endblocked methylvinylsiloxane oligomer. The composition according to the present invention may also contain organic solvents such as toluene, xylene, acetone, methyl ethyl ketone, methyl isobutyl ketone, hexane, heptane, and so forth; noncrosslinking organopolysiloxanes such as trimethylsiloxy-endblocked polydimethylsiloxanes, trimethylsiloxy-endblocked polymethylphenylsiloxanes, and so forth; as well as flame retardants; heat stabilizers; plasticizers; thixotropy donors; adhesion promoters; antimolds; and so forth.

The composition according to the present invention is preferably stored as a two-part formulation of compositions (I) and (II) and mixed to homogeneity just before use, wherein composition (I) contains components (D) and (E) and contains neither component (a) nor component (B), composition (II) contains components (a) and (B) and contains neither component (D) nor component (E), and components (b) and (C) may be mixed into either composition. While the composition according to the present invention can also be stored as a one-part formulation, its execution as a two-part formulation will avoid the decline in curability and adherence that would otherwise occur during storage.

The technique for using the composition according to the present invention to fabricate silicone rubber gaskets is exemplified by application of the present composition to the joining surface of at least 1 of the two or more joining members, bolting the joining members together, and curing the silicone rubber composition to form the silicone rubber gasket in the joint. A dispenser-equipped robot applicator is ordinarily used to apply the composition to the joining surface(s). Moreover, the joining surface or surfaces may be planar or may present a groove at the site of gasket fabrication. The composition should be applied in an amount that provides a satisfactorily performing gasket. However, an optimized amount must be applied that avoids overapplication since squeezing the composition out from the joint surface will result in a negative appearance. After application of the composition to the joint surface, the joining or connecting members are bolted together, with the bolting pressure being adjusted as appropriate. The composition is then cured to form a silicone rubber gasket in the joint surface in which the joining members participate. While the cure of the composition may be effected by heating at up to 50° C., a satisfactory cure can also be obtained by standing at room temperature.

The composition according to the present invention is highly qualified for the fabrication of gaskets for automotive applications, e.g., lamp housings, fuse boxes, air filters, oil pan gaskets, oil seal case gaskets, oil screen gaskets, timing belt cover upper gaskets, timing rocker cover lower gaskets, and so forth, and also for the fabrication of gaskets for electrical appliances such as waterproof connectors, air conditioners, lighting devices, and so forth.

EXAMPLES

The FIPG silicone rubber composition according to the present invention will be explained in greater detail through working examples. The viscosity values reported in the examples were measured at 25° C. To measure the surface cure time of the compositions, the particular composition was held at 20° C. in a 55% relative humidity (hereinafter "RH") atmosphere and the time was measured until the formation of a rubber skin on the surface. The pressure resistance immediately after application was measured using the pressure-resistance test specified in JIS K 6820 (Liquid Gaskets). In this test, the composition was applied as a bead with a diameter of 3 mm on the mating surface of a flanged pressure vessel for pressure-resistance testing. The flanging was then bolted down with tightening bolts to a clearance of 0.5 mm and the assembly was held for 30 minutes at room temperature. Using air as the pressurizing medium, the pressure container was then incrementally pressurized to 1 kgf/cm$^2$ in increments of 0.2 kgf/cm$^2$ using a holding time of 1 minute at each step. After reaching 1.0 kgf/cm$^2$, pressurization was then carried out incrementally to 5.5 kgf/cm$^2$ in increments of 0.5 kgf/cm$^2$ using a holding time of 1 minute at each step. The pressure resistance is reported as the pressure just prior to the appearance of air leakage.

The cure time of the composition was measured while holding the composition at 20° C. and 55% RH and was the time required for the entire composition to become rubbery. The tensile shear adhesive strength of the cured silicone rubber was measured in accordance with JIS K 6850 (Methods for Testing the Tensile Shear Adhesive Strength of Adhesives). In this test, aluminum coupons (JIS H 4000) were used as the adherends, and the particular silicone rubber composition was coated to give a bonding zone of 25 mm×10 mm×1 mm. The test specimen was obtained by holding for 4 days at 20° C. and 55% RH. The adhesive strength of this test specimen was then measured in tensile shear. The post-cure pressure resistance was measured using the pressure-resistance test specified in JIS K 6820 (Liquid Gaskets). In this test, the composition was applied as a bead with a diameter of 3 mm on the mating surface of a flanged pressure vessel for pressure-resistance testing. The flanging was then bolted down with tightening bolts to a clearance of 0.5 mm and the assembly was held for 4 days at 20° C. and 55% RH. Using air as the pressurizing medium, the pressure container was then incrementally pressurized to 1 kgf/cm$^2$ in increments of 0.2 kgf/cm$^2$ using a holding time of 1 minute at each step. After reaching 1.0 kgf/cm$^2$, pressurization was then carried out incrementally to 5.5 kgf/cm$^2$ in increments of 0.5 kgf/cm$^2$ using a holding time of 1 minute at each step. The post-cure pressure resistance is reported as the pressure just prior to the appearance of air leakage.

EXAMPLE 1

A composition (i) was prepared by mixing the following to homogeneity: 40 weight parts dimethylvinylsiloxy-endblocked polydimethylsiloxane with a viscosity of 10,000 centipoise and a vinyl content of 0.14 weight %; 10 weight parts polyorganosiloxane with a vinyl content of 0.79 weight % and composed of the $(CH_3)_3SiO_{1/2}$, $(CH_2=CH)(CH_3)_2SiO_{1/2}$, and $SiO_{4/2}$ units; 10 weight parts hydrophobicized dry-process silica micropowder as afforded by treating the surface of dry-process silica micropowder (BET specific surface area=200 $m^2/g$) with hexamethyldisilazane; 5 weight parts quartz powder with an average particle size of 5 micrometers; 1.0 weight part methyltrimethoxysilane; 1.0 weight pad diisopropoxybis(ethyl acetoacetate) titanium; and platinum-1,1,3,3-tetramethyl-1,3-divinyldisiloxane complex in an amount sufficient to provide 20 weight-ppm platinum metal atoms based on the present composition.

A composition (ii) was then prepared by mixing the following to homogeneity: 20 weight parts trimethoxysiloxy-endblocked polydimethylsiloxane with a viscosity of 20,000 centipoise; 25 weight parts dimethylvinylsiloxy-endblocked polydimethylsiloxane with a viscosity of 10,000 centipoise and a vinyl content of 0.14 weight %; 5 weight parts polyorganosiloxane with a vinyl content of 0.79 weight % and composed of the $(CH_3)_3SiO_{1/2}$, $(CH_2=CH)(CH_3)_2SiO_{1/2}$, and $SiO_{4/2}$ units; 8 weight parts hydrophobicized dry-process silica micropowder as afforded by treating the surface of dry-process silica micropowder (BET specific surface area=200 $m^2/g$) with hexamethyldisilazane; 5 weight parts quartz powder with an average particle size of 5 micrometers; 2.0 weight parts trimethylsiloxy-endblocked dimethylsiloxane-methylhydrogensiloxane copolymer with a viscosity of 10 centipoise and a silicon-bonded hydrogen content of 0.74 weight %; and 2.0 weight parts 3-glycidoxypropyltrimethoxysilane.

Approximately equal amounts of the compositions (i) and (ii) were then mixed to homogeneity to yield a FIPG silicone rubber composition. The properties of this composition are reported in Table 1.

EXAMPLE 2

A composition (iii) was prepared by mixing the following to homogeneity: 38 weight parts dimethylvinylsiloxy-endblocked polydimethylsiloxane with a viscosity of 10,000 centipoise and a vinyl content of 0.14 weight %; 10 weight parts polyorganosiloxane with a vinyl content of 0.79 weight % and composed of the $(CH_3)_3SiO_{1/2}$, $(CH_2=CH)(CH_3)_2SiO_{1/2}$, and $SiO_{4/2}$ units; 10 weight parts hydrophobicized dry-process silica micropowder as afforded by treating the surface of dry-process silica micropowder (BET specific surface area=130 $m^2/g$) with dimethyldimethoxysilane and hexamethyldisilazane; 20 weight parts quartz powder with an average particle size of 5 micrometers; 1.0 weight part methyltrimethoxysilane; 1.0 weight pad diisopropoxybis(ethyl acetoacetate)titanium; and platinum-1,1,3,3-tetramethyl-1,3-divinyldisiloxane complex in an amount sufficient to provide 100 weight-ppm platinum metal atoms based on the present composition.

A composition (iv) was then prepared by mixing the following to homogeneity: 50 weight parts trimethoxysilylethyldimethylsiloxy-endblocked polydimethylsiloxane with a viscosity of 20,000 centipoise; 2 weight parts dimethylvinylsiloxy-endblocked polydimethylsiloxane with a viscosity of 10,000 centipoise and a vinyl content of 0.14 weight %; 1.0 weight part trimethylsiloxy-endblocked dimethylsiloxane-methylhydrogensiloxane copolymer with a viscosity of 10 centipoise and a silicon-bonded hydrogen content of 0.74 weight %; 5 weight parts hydrophobicized dry-process silica micropowder as afforded by treating the surface of dry-process silica micropowder (BET specific surface area=130 $m^2/g$) with dimethyldimethoxysilane and hexamethyldisilazane; 20 weight parts quartz powder with an average particle size of 5 micrometers; 0.5 weight part 3-glycidoxypropyltrimethoxysilane; and 1.5 weight parts 3-methacryloxypropyltrimethoxysilane.

Approximately equal amounts of the compositions (iii) and (iv) were then mixed to homogeneity to yield a FIPG silicone rubber composition. The properties of this composition are reported in Table 1.

EXAMPLE 3

A composition (v) was prepared by mixing the following to homogeneity: 46 weight parts dimethylvinylsiloxy-endblocked polydimethylsiloxane with a viscosity of 10,000 centipoise and a vinyl content of 0.14 weight %; 10 weight parts hydrophobicized dry-process silica micropowder as afforded by treating the surface of dry-process silica micropowder (BET specific surface area=130 $m^2/g$) with dimethyldimethoxysilane and hexamethyldisilazane; 22 weight parts quartz powder with an average particle size of 5 micrometers; 1.0 weight part methyltrimethoxysilane; 1.0 weight part diisopropoxybis(ethyl acetoacetate)titanium; and platinum-1,1,3,3-tetramethyl-1,3-divinyldisiloxane complex in an amount sufficient to provide 50 weight-ppm platinum metal atoms based on the present composition.

A composition (vi) was then prepared by mixing the following to homogeneity: 17 weight parts trimethoxysiloxy-endblocked polydimethylsiloxane with a viscosity of 20,000 centipoise; 37 weight parts dimethylvinylsiloxy-endblocked polydimethylsiloxane with a viscosity of 10,000 centipoise and a vinyl content of 0.14 weight %; 5 weight parts hydrophobicized dry-process silica micropowder as afforded by treating the surface of dry-process silica micropowder (BET specific surface area=130 $m^2/g$) with dimethyldimethoxysilane and hexamethyldisilazane; 18 weight parts quartz powder with an average particle size of 5 micrometers; 1.0 weight part trimethylsiloxy-endblocked dimethylsiloxane-methylhydrogensiloxane copolymer with a viscosity of 10 centipoise and a silicon-bonded hydrogen content of 0.74 weight %; 0.5 weight part 3-glycidoxypropyltrimethoxysilane; and 1.5 weight parts 3-methacryloxypropyltrimethoxysilane.

Almost equal amounts of the compositions (v) and (vi) were then mixed to homogeneity to yield a FIPG silicone rubber composition. The properties of this composition are reported in Table 1.

COMPARATIVE EXAMPLE 1

The following were mixed to homogeneity to give a silicone rubber composition for application as a formed-in-place gasket: 100 weight parts hydroxyl-endblocked polydimethylsiloxane With a viscosity of 15,000 centipoise, 2 weight parts hydroxyl-endblocked polymethylphenylsiloxane with a viscosity of 500 centipoise, 9 weight parts dry-process silica micropowder with a BET specific surface area of 200 $m^2/g$, 8 weight parts vinyltris(methyl ethyl ketoxime)silane, 1 weight part 3-aminopropyltriethoxysilane, and 0.1 weight part dibutyltin dilaurate. The properties of this composition are reported in Table 1.

COMPARATIVE EXAMPLE 2

The following were mixed to homogeneity to give a silicone rubber composition for application as a formed-inplace gasket: 100 weight parts trimethoxysilylethyldimethylsiloxy-endblocked polydimethylsiloxane with a viscosity of 20,000 centipoise, 10 weight parts dry-process silica micropowder with a BET specific surface area of 150 m²/g, 67 weight parts calcium carbonate, 8 weight parts methyltrimethoxysilane, and 0.7 weight part diisopropoxybis(ethyl acetoacetate)titanium. The properties of this composition are reported in Table 1.

COMPARATIVE EXAMPLE 3

The following were mixed to homogeneity to give a silicone rubber composition for application as a formed-in-place gasket: 67 weight parts dimethylvinylsiloxy-endblocked polydimethylsiloxane with a viscosity of 10,000 centipoise and a vinyl content of 0.14 weight %; 16 weight parts polyorganosiloxane with a vinyl content of 0.79 weight % and composed of the $(CH_3)_3SiO_{1/2}$, $(CH_2=CH)(CH_3)_2SiO_{1/2}$, and $SiO_{4/2}$ units; 17 weight parts hydrophobicized dry-process silica micropowder as afforded by treating the surface of dry-process silica micropowder (BET specific surface area=200 m²/g) with hexamethyldisilazane; 8 weight parts quartz powder with an average particle size of 5 micrometers; 2 weight parts trimethylsiloxy-endblocked dimethylsiloxane-methylhydrogensiloxane copolymer with a viscosity of 10 centipoise and a silicon-bonded hydrogen content of 0.74 weight %; platinum-1,1,3,3-tetramethyl-1,3-divinyldisiloxane complex in an amount sufficient to provide 14 weight-ppm platinum metal atoms based on the present composition; 1.7 weight parts 3-glycidoxypropyltrimethoxysilane; and 0.04 weight part 1,3,5,7-tetramethyl-1,3,5,7-tetravinylcyclotetrasiloxane. The properties of this composition are reported in Table 1.

TABLE 1

| | Present Invention | | | Comparative Examples | | |
|---|---|---|---|---|---|---|
| Surface Cure Time (minutes) | — | — | — | 5 | 15 | — |
| Pressure Resistance Immediately After Application (kgf/cm²) | >5.0 | >5.0 | >5.0 | 0.2 | 0.2 | >5.0 |
| Cure Time (minutes) | 15 | 35 | 25 | — | — | 30 |
| Tensile Shear Adhesive Strenght (kgf/cm²) | 18 | 26 | 25 | 20 | 15 | 4 |
| Post-Cure Pressure Resistance (kgf/cm²) | >5.0 | >6.0 | >5.0 | >5.0 | >5.0 | >5.0 |

The FIPG silicone rubber composition according to the present invention is characterized by its excellent pressure resistance immediately after application and by its capacity to cure into a highly pressure-resistant and strongly adherent silicone rubber gasket.

That which is claimed is:

1. A silicone rubber composition, comprising (A) 100 parts by weight of a mixture comprising (a) 5 to 95 weight % of an alkoxy-substituted polyorganosiloxane having a viscosity at 25° C. of 20 to 1,000,000 centipoise and containing an average of at least two silicon-bonded alkoxy groups per molecule; and (b) 95 to 5 weight % of an alkenyl-substituted polyorganosiloxane having a viscosity at 25° C. of 20 to 1,000,000 centipoise and containing an average of at least two silicon-bonded lower alkenyl groups per molecule; and (B) a polyorganosiloxane containing an average of least two silicon-bonded hydrogen atoms per molecule, in a quantity that affords a value of 0.3 to 10 for the molar ratio of silicon-bonded hydrogen atoms to silicon-bonded lower alkenyl groups in component (b), (C) 0.01 to 20 parts by weight of an organosilicon compound selected from the group consisting of alkoxysilanes having the general formula

and partial hydrolysis condensates thereof; wherein each $R^1$ is selected from the group consisting of monovalent hydrocarbon groups, epoxy-functional organic groups, and acrylic-functional organic groups, $R^2$ is alkyl or alkoxyalkyl, and a is 0, 1, or 2;

(D) 0.01 to 20 parts by weight of a condensation reaction catalyst; and (E) a catalytic quantity of a platinum catalyst;

wherein at least one $R^1$ group is selected from the group consisting of epoxy-functional organic groups and acrylic-functional organic groups.

2. The composition according to claim 1, in a two-part formulation comprising (I) a catalyst-containing composition essentially comprising component (D) and component (E); and (II) a crosslinker-containing composition essentially comprising component (a) and component (B);

wherein components (b) and (C) may be mixed into either (I) or (II).

3. The composition according to claim 1 wherein the alkoxy groups of component (a) are methoxy.

4. The composition according to claim 1 wherein the viscosity at 25° C. of component (a) is 100 to 500,000 centipoise.

5. The composition according to claim 1 wherein $R^2$ is methyl.

6. The composition according to claim 1 wherein a is 1.

7. The composition according to claim 1 wherein component (C) is present in an amount ranging from 0.1 to 10 weight parts per 100 weight parts of component (A).

8. The composition according to claim 1 wherein component (D) is present in an amount ranging from 0.1 to 5 weight parts per 100 weight parts of component (A).

9. The composition according to claim 8, wherein component (D) is present in an amount ranging from 0.1 to 5 weight parts per 100 weight parts of component (A).

10. The composition according to claim 1 wherein component (E) is platinum catalyst and is present in an amount ranging from 0.01 to 1,000 weight ppm platinum as the metal per 100 weight parts of component (A).

11. The composition according to claim 10 wherein the platinum of component (E) is present in an amount ranging from 0.5 to 200 weight ppm platinum as the metal per 100 weight parts of component (A).

12. A product obtained from the incipient materials:

(A) 100 parts by weight of a mixture comprising (a) 5 to 95 weight % of an alkoxy-substituted polyorganosiloxane having a viscosity at 25° C. of 20 to 1,000,000 centipoise and containing an average of at least two silicon-bonded alkoxy groups per molecule; and (b) 95 to 5 weight % of an alkenyl-substituted polyorganosiloxane having a viscosity at 25° C. of 20 to 1,000,000 centipoise and containing an average of at least two silicon-bonded lower alkenyl groups per molecule; and (B) a polyorganosiloxane containing an average of least two silicon-bonded hydrogen atoms per molecule, in a quantity that affords a value of 0.3 to 10 for the molar ratio of silicon-bonded hydrogen atoms to silicon-bonded lower alkenyl groups in component (b), (C) 0.01 to 20 parts by weight of an organosilicon compound selected from the group consisting of alkoxysilanes having the general formula $$R^1_a Si(OR^2)_{4-a}$$

and partial hydrolysis condensates thereof; wherein each $R^1$ is selected from the group consisting of monovalent hydrocarbon groups, epoxy-functional organic groups, and acrylic-functional organic groups, $R^2$ is alkyl or alkoxyalkyl, and a is 0, 1, or 2;

(D) 0.01 to 20 parts by weight of a condensation reaction catalyst; and (E) a catalytic quantity of a platinum catalyst;

wherein at least one $R^1$ group is selected from the group consisting of epoxy-functional organic groups and acrylic-functional organic groups.

* * * * *